United States Patent
Shell et al.

(10) Patent No.: US 10,956,615 B2
(45) Date of Patent: Mar. 23, 2021

(54) SECURELY DEFINING OPERATING SYSTEM COMPOSITION WITHOUT MULTIPLE AUTHORING

(71) Applicant: MICROSOFT TECHNOLOGY LICENSING, LLC, Redmond, WA (US)

(72) Inventors: Scott R. Shell, Kirkland, WA (US); Md. Nazmus Sakib, Seattle, WA (US); Kinshumann, Redmond, WA (US); Dale R. Rolf, Renton, WA (US); Daryn E. Robbins, Carnation, WA (US); Ian McCarty, Sammamish, WA (US); JianMing M. Zhou, Sammamish, WA (US); David J. Linsley, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 15/436,719

(22) Filed: Feb. 17, 2017

(65) Prior Publication Data
US 2018/0239929 A1 Aug. 23, 2018

(51) Int. Cl.
*G06F 21/64* (2013.01)
*G06F 8/65* (2018.01)
(Continued)

(52) U.S. Cl.
CPC ............... *G06F 21/64* (2013.01); *G06F 8/65* (2013.01); *G06F 9/4406* (2013.01); *G06F 21/51* (2013.01); *G06F 21/575* (2013.01)

(58) Field of Classification Search
CPC . G06F 21/64; G06F 8/65; G06F 21/62; G06F 21/575; G06F 21/51; G06F 9/4406;
(Continued)

(56) References Cited

U.S. PATENT DOCUMENTS

| 6,430,608 B1 | 8/2002 | Shaio |
| 6,463,535 B1 * | 10/2002 | Drews ................... G06F 9/4416 713/176 |

(Continued)

OTHER PUBLICATIONS

"Advanced usage NeoMAD", http://docs.neomades.com/en/3.9/user-guide/advanced.html, Retrieved on: Dec. 22, 2016, 25 pages.
(Continued)

*Primary Examiner* — Maung T Lwin
*Assistant Examiner* — Sanchit K Sarker
(74) *Attorney, Agent, or Firm* — Ray Quinney & Nebeker, P.C.; Thomas M. Hardman; Thomas R. Marquis (57) ABSTRACT

Embodiments are directed to managing software components loaded on a device by identifying a platform manifest having a valid certificate, confirming that the platform manifest is bound to the device, identifying components listed on the platform manifest, confirming that the listed components have a valid certificate, and loading listed components with valid certificates on the device. The components may be binaries and packages for an operating system. The components may be signed in an embedded manner or with detached signatures. The platform manifest may be bound to the device in a manner that allows for identification of unauthorized platform manifests.

20 Claims, 4 Drawing Sheets

(51) Int. Cl.
*G06F 9/4401* (2018.01)
*G06F 21/51* (2013.01)
*G06F 21/57* (2013.01)

(58) Field of Classification Search
CPC ............... G06F 21/10; G06F 21/556; G06F 2221/2119; H04L 63/0428; H04L 67/1097; H04L 63/102
USPC .............................................. 726/1; 713/176
See application file for complete search history.

(56) References Cited

U.S. PATENT DOCUMENTS

| | | |
|---|---|---|
| 7,107,463 B2 | 9/2006 | England et al. |
| 7,478,243 B2 | 1/2009 | Bolosky et al. |
| 7,788,637 B2 | 8/2010 | Hunt et al. |
| 8,434,067 B2 | 4/2013 | Nagabhushan et al. |
| 8,601,273 B2 | 12/2013 | Schluessler et al. |
| 2004/0064457 A1* | 4/2004 | Zimmer ................ G06F 21/575 |
| 2005/0091658 A1 | 4/2005 | Kavalam et al. |
| 2005/0132357 A1 | 6/2005 | Shell et al. |
| 2007/0235517 A1 | 10/2007 | O'connor et al. |
| 2008/0127179 A1 | 5/2008 | Moss et al. |
| 2009/0276442 A1* | 11/2009 | Parthasarathy ........... G06F 8/60 |
| 2010/0169633 A1* | 7/2010 | Zimmer ................ G06F 21/575 713/2 |
| 2012/0284702 A1 | 11/2012 | Ganapathy et al. |
| 2013/0290694 A1* | 10/2013 | Civilini ............... H04L 41/0806 713/2 |
| 2014/0331064 A1* | 11/2014 | Ballesteros ........... H04L 9/0877 713/193 |
| 2016/0378990 A1* | 12/2016 | Goodman ............... G06F 21/64 726/19 |
| 2017/0366359 A1* | 12/2017 | Scarlata ................ H04L 9/3268 |

OTHER PUBLICATIONS

"International Search Report and Written Opinion Issued in PCT Application No. PCT/US18/018081", dated May 15, 2018, 12 Pages.

"How to: Sign Application and Deployment Manifests", Retrieved From: https://docs.microsoft.com/en-us/visualstudio/de/how-to-sign-application-and-deployment-manifests?view=vs-2017, Apr. 11, 2016, 4 Pages.

"Office Action Issued in European Patent Application No. 18707825.8", dated Jul. 16, 2020, 6 Pages.

* cited by examiner

SECURELY DEFINING OPERATING SYSTEM COMPOSITION WITHOUT MULTIPLE AUTHORING

BACKGROUND

Operating systems originally created for desktop computers have more recently expanded into other devices, such as mobile phones and game controllers. The transition of an operating system from the desktop platform to the mobile phone platform is complicated because of differing security models in these devices. The personal computer platform is generally an open platform. On the other hand, the mobile operating system is typically a locked-down platform. Mobile phones do not have the same logon concept like logging on to a personal computer and, therefore, they do not have the same set of user permissions and access control lists found on desktops.

Because mobile phones are directly connected to a mobile network, an important concern is protecting these networks. Service providers need to be sure that malicious or disruptive applications that might threaten the security and integrity of the network are not installed or run on a mobile phone. When mobile phone operating systems are being developed, existing desktop components are reused to provide the same functionality on the mobile phone despite the different security models. However, if the various development tools and management tools designed for the desktop were used without restriction, that would mean subverting the mobile phone lockdown model. A component that is acceptable on the desktop might not be safe on a mobile phone.

To maintain the mobile phone as a locked-down platform, there is a need to distinguish between components that are supposed to work on each platform. This is accomplished using two different sets of digital signatures. There is a desktop set of code-signed certificates, and a mobile phone set of code-signed certificates.

The components that are to run on the mobile phone platform need to be signed with the mobile phone set of code-signed certificates. Typically, the development process produces all the desktop components first, and then mobile build process begins. The mobile build process ingests relevant desktop components. Then, there is a re-signing step to authorize the selected desktop components and distinguish them from all other non-ingested desktop components with mobile code-signed certificates. For other components that were built specifically for mobile, they are signed with the mobile code-signed certificates without any sort of ingestion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A platform manifest creates simplifies the operating system signing system by allowing all files in the operating system to be signed with the same set of certificates, but still allowing individual platforms or editions that limit which parts of the operating system run on a device. This feature prevents cross-pollination attacks wherein an attacker takes a file from a different edition of the operating system and places it on a device for which it was not intended, which has the potential for significant negative effects on the security of that platform. The platform manifest itself is automatically generated from the definition of the edition during the operating system build.

The platform manifest feature is a part of the overall code-signing strategy. The purpose of the platform manifest is to limit the authorization of a certificate to only a subset of the files signed by that certificate. Specifically, the platform manifest authorizes packages and individual files based on their inclusion in a particular edition of the operating system. Files and other packages that are not authorized on the operating system edition will be disallowed even if they are signed with a valid certificate.

A method for managing software components loaded on a device comprises identifying a platform manifest having a valid certificate, confirming that the platform manifest is bound to the device, identifying components listed on the platform manifest, confirming that the listed components have a valid certificate, and loading listed components with valid certificates on the device. The components may be binaries and packages for an operating system. The components may be signed in an embedded manner or with detached signatures. The platform manifest may be bound to the device in a manner that allows for identification of unauthorized platform manifests.

The method may further comprise identifying an additional component having a valid code-signed certificate, determining that the additional component is not listed on the platform manifest, and blocking the additional component from the device.

The method may further comprise identifying a manifest identifier in a device security policy, and using the manifest identifier to confirm that the platform manifest is bound to the device.

The method may further comprise identifying a plurality of manifest identifiers in a device security policy, loading a plurality of platform manifest files corresponding to the plurality of manifest identifiers, and merging the plurality of platform manifest files into an active platform manifest for the device.

A device comprises a processor executing an operating system loader and a code integrity component, and a device memory storing a security policy and operating system components, wherein the operating system loader is configured to identify a platform manifest using a platform manifest identifier in the security policy and to load components listed in the platform manifest, and wherein the code integrity component is configured to confirm that the platform manifest and the components listed in the platform manifest have valid certificates before the operating system loader loads the components.

The components may be binaries and packages for an operating system. The device security policy may be used to confirm that the platform manifest is bound to the device. The components may be signed in an embedded manner or with detached signatures. The platform manifest may be bound to the device in a manner that allows for identification of unauthorized platform manifests.

The operating system loader may be further configured to load a plurality of platform manifest files corresponding to a plurality of manifest identifiers in the security policy and to merge the plurality of platform manifest files into an active platform manifest for the device.

The operating system loader may be further configured to determine that additional components are not listed on the platform manifest and to block the additional components from the device even if the code integrity component identified the additional components as having valid code-signed certificates.

A method of enforcing an operating system composition comprises selecting a plurality of files to be included in the operating system for a selected platform, the files having valid certificates, and generating one or more platform manifests each having a platform manifest identifier and a valid certificate and listing one or more of the plurality of files.

The method may further comprise controlling what operating system can be loaded on a device by listing acceptable platform manifest identifiers in a device security policy, wherein files for other operating systems will not be loaded on the device if the files do not appear on acceptable platform manifests.

The method may further comprise merging two or more platform manifests into an active platform manifest for a device.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

An edition or SKU (stock keeping unit) of an operating system is created by choosing from a selection of components that are required to provide the functionality desired for that SKU. Each component consists of a collection of binaries (executable files) and configuration data. These files are signed by the operating system build. Each SKU chooses which components the operating system includes. There are many SKUs derived from a single build of an operating system, such as home, professional, server, mobile, and embedded versions. Additionally, an OEM (original equipment manufacturer) may create operating system platforms tailored to particular needs. The OEM can pick from available components and build a platform that only contains the components they need. This choice enables them to reduce the footprint of the operating system, which also reduces the attackable surface area of their platform. However, if an attacker can get other binaries onto a device, the device will trust those binaries as accepted by the operating system.

To reduce the attack surface further, and avoid other cross-pollination issues, some SKUs of the operating system will re-sign the files so that they may remove trust for how the Windows build signed the files and instead only trust those files that are included in that edition. For example, the mobile operating system build takes identical copies of binaries from the desktop build and re-signs them with a mobile certificate. This model is wasteful in several ways. First, the signing infrastructure must maintain multiple sets of certificates and must handle the workload required to sign the multiple copies of files that require signing. Second, updates are diverged because multiple copies must be processed and the update pipeline must know which bits to deliver to a particular SKU. Also, updates must be coordinated across SKUs when a component requires a service update or temporary patch.

Figure 1:
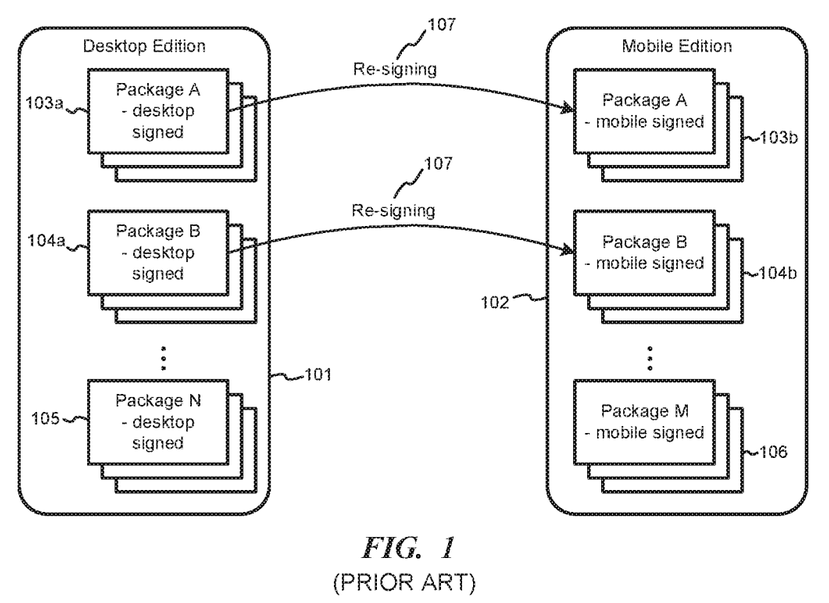
FIG. 1 is a block diagram illustrating traditional creation of different editions of an operating system.

FIG. 1 is a block diagram illustrating traditional creation of different editions of an operating system. An operating system vendor may ship multiple platforms, such as a desktop edition 101 of the operating system and a mobile edition 102. Each edition uses a large set of common components, such as package A 103 and package B 104. Different editions also have many components that are specific to each platform. For example, package N 105 is used in the desktop edition only, and package M 106 is used in the mobile edition only. The vendor builds the packages 103-106 in the same common build system.

Each platform may have a different security promise and a component, such as package N 105, that is essential to desktop platform 101 might compromise the security of mobile platform 102 if package N 105 ran on a mobile device. To protect customers the mobile platform is typically intended to be a locked-down operating system. A legitimate desktop component, such as a registry editor that enables viewing, searching, and changing settings in a system registry, could subvert many of the security promises of the operating system if run on the mobile device. To solve this problem, all mobile components 103b, 104b, and 106 are signed with different valid certificates, such as code-signed certificates. The mobile platform enforces that everything has to be signed by the mobile certificate. For the common components 103, 104, there is a re-signing process 107 that applies the mobile code-signed certificate to existing desktop-signed packages A 103 and B 104. Original desktop code-signed package versions 103a, 104a are converted to mobile code-signed packages 103b, 104b so that they will be allowed to run on the mobile platform.

There are several problems with the existing approach. First, a separate list of code-signed certificates must be maintained to sign each platform. This creates certificate-management overhead and increases the surface area for reliability problems. Second, multiple code-signed certificates are used to validly sign the different types of components in each platform. To get to valid builds, mappings needed to be maintained for how components are to be signed with each platform in addition to definitions of which components constitute each platform. Third, it takes additional time to re-sign all components being reused for different platforms, which increases the overall build completion time.

A solution to the problems with existing operating system builds eliminates the use of the re-signing step and instead generates a platform manifest during the regular mobile-image creation process. The platform manifest comprises a list of authorized binaries and packages. The platform manifest can be referenced at code-execution time to determine if a binary that is about to execute is authorized for that platform.

The platform manifest is a signed document that allows the system to validate that no one has tampered with the platform manifest. Signing the platform manifest also provides a secure way to ensure that an attacker cannot compromise the security of the platform simply by adding a binary to the list of authorized binaries and packages.

The platform manifest that identifies the components required for a particular SKU without requiring re-signing of the components. SKUs or tailored editions can define trust in an operating system as being a specific collection of components that are solely signed by the operating system build as defined in the platform manifest. A signed platform manifest defines a SKU of the operating system. Files are included in the build for that SKU if they appear on the platform manifest and if they are signed. The platform manifest is bound to a device (i.e., a device associated with the SKU). Alternatively, a security policy bound to the device may allow for the platform manifest.

A signed file includes an identifier for its parent component in an authenticated attribute. When signing a catalog for a component, an identifier of that component is included in an authenticated attribute. An authenticity verifiable composition configuration for a SKU includes the list of component identifiers that form that SKU. When authorizing a file, the identifiers of the file's parent component are compared with the list of identifiers in the composition.

The platform manifest lists information about that packages that are to be included in an operating system image. Those packages may be from an existing operating system image, such as a desktop edition, or they may be something that has been produced specifically for that particular operating system image. The platform manifest is signed so that alterations are detectable and the platform manifest can be trusted. The platform manifest prevents cross-pollination by blocking validly signed binaries intended for one operating system build from being loaded with other operating systems at runtime.

A new platform manifest can be generated for each operating system image. The platform manifest is created when the operating system image is created, and the platform manifest is checked when the operating system is actually in use. When a device loads the operating system during a boot process, the device checks that the platform manifest is a valid file and that all the binaries that the system is loading as operating system components are authorized based on the contents of the platform manifest file. Additionally, any time an executable file is loaded, it is checked against the platform manifest, which cannot be altered without detection. The system verifies that the binaries and executables have the proper code-signed certificate. The system can take some remediation action if the signature is not what is expected, such as reloading the file or retrieving a cached version of the file.

The platform manifest is an extensible way to build and lock down operating systems from a common engineering base. The same tooling can be used without requiring a re-signing process and different code signing certificates. All that is needed is to generate one more file—the platform manifest—whenever the vendor wants to make a new operating system that needs to be locked down. The platform manifest is bound to a particular device type.

The platform manifest identifies the packages expected to be on a particular build. The platform manifest lists specific files by name or other identifier. Binaries and packages may be identified in the platform manifest by, for example, name, catalog (.cat) file, or cabinet (.cab) file, which is a compressed file that contains other distribution files, such as drivers and system files. The platform manifest does not identify what signature to expect for each component, but the listed components must be signed with an embedded or a detached signature.

This technology specifically generates a platform manifest automatically without requiring an authoring. At the time the operating system image is generated, a list of all components used in the image are put on an allow list. So, anything that was built and signed in the common engineering system but not included in this image will not be on the allow list and, therefore, it will not pass the platform manifest test and will not be loaded on the device.

A device, such as desktop or mobile, has a security policy that defines the base security policies of the system, such as a secure boot configuration policy. The security policy is being extended to have additional values related to the platform manifest. The platform manifest is designed only to limit signatures. A file or catalog that would not have been trusted in an existing code integrity system will still not be trusted using the platform manifest feature. However, some signatures that would have been trusted under prior security systems will now be disallowed.

Figure 2:
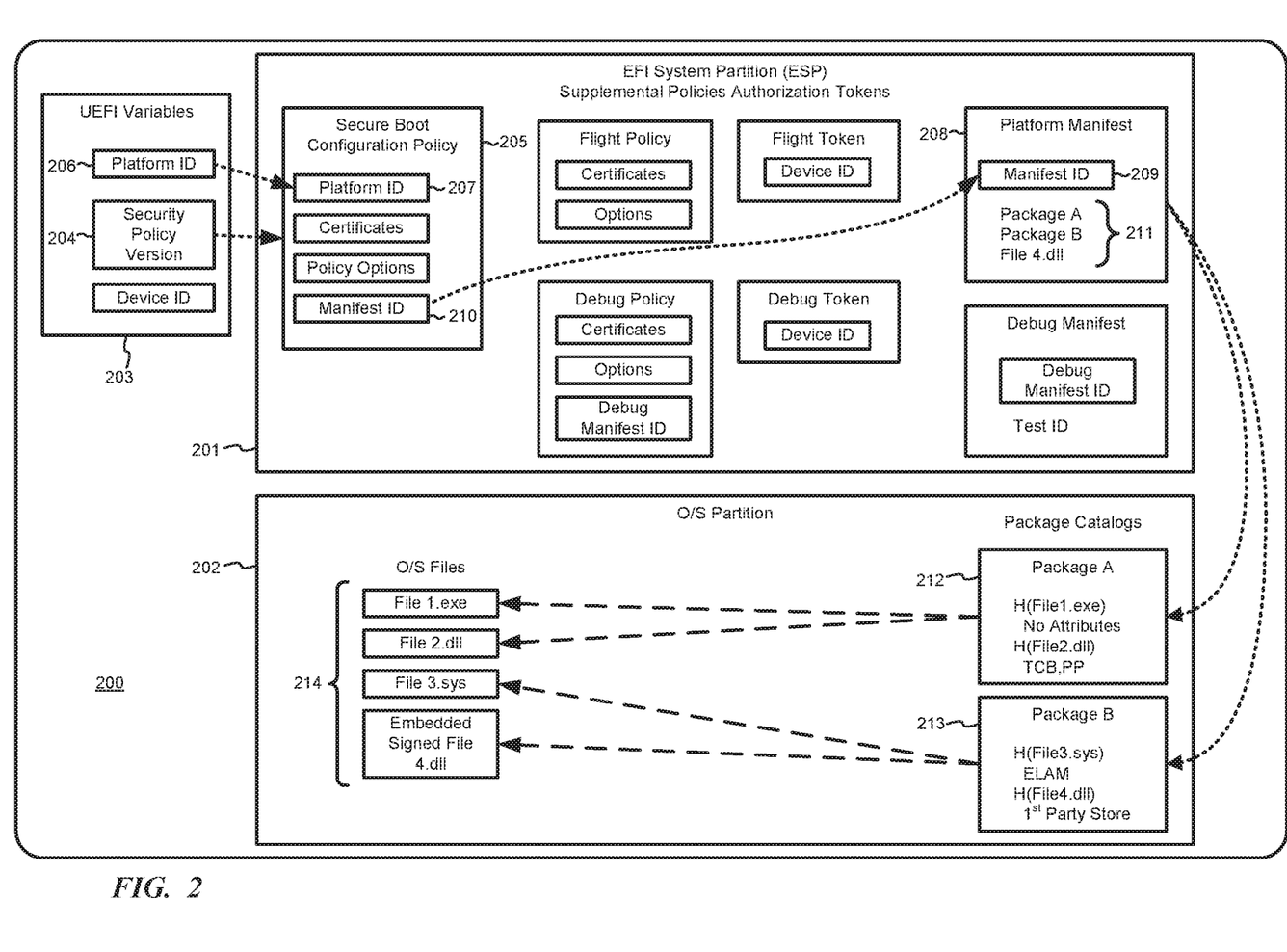
FIG. 2 is a block diagram of a data storage, such as a hard disk drive or solid-state drive, on a device running an operating system according to embodiments described herein.

FIG. 2 is a block diagram of a data storage, such as a hard disk drive or solid-state drive, on a device 200 running an operating system. The data storage has an EFI system partition 201, which is a partition used by devices adhering to the Unified Extensible Firmware Interface (UEFI). When the device is booted, UEFI firmware loads files stored on the EFI system partition (ESP) 201 to start installed operating systems and utilities. ESP 201 contains boot loaders or kernel images for the installed operating system, which is contained in O/S partition 202. ESP 201 also contains driver files for hardware present on the device, system utility programs, and data files such as error logs. The UEFI firmware uses UEFI variables 203 to boot the device.

UEFI variables 203 identify a security policy version 204 that points to a corresponding to the secure boot configuration policy 205 in ESP 201. UM variables 203 further provide a platform identifier 206 that points to a platform identifier 207 in secure boot configuration policy 205. The platform manifest 208 is one or more files that are loaded from ESP 201. Platform manifest 208 is a signed file that is authorized by a manifest identifier 209 having a corresponding value 210 in secure boot configuration policy 205. Multiple platform manifest files can be authorized by secure boot configuration policy 205 and all of them will be loaded by the device. When multiple platform manifest files are loaded, they are merged together to form an active platform manifest for the system.

The platform manifest 208 is loaded by the UEFI boot manager right after loading secure boot configuration policy 205. This occurs early in the system before any other signatures are verified. The active platform manifest 208 is transferred from the boot manager to a system loader and kernel so they can use the platform manifest to validate that signatures are valid during operating system loading.

The platform manifest 208 comprises a list 211 of package and binaries that are allowed for this operating system edition. The listed packages and binaries 211 point to components, such as package A 212 and package B 213, on O/S partition 202. Operating system files 214 are extracted and loaded from the package and binaries listed in platform manifest 208.

The system verifies that the platform manifest 208 is bound to the device 200 and that the platform manifest is code-signed. The platform manifest 208 may be bound to device 200 directly or indirectly, such as by a security policy that is bound to the device 200. Components 212 and 213 are verified as listed on the platform manifest and must also be code-signed with valid certificates. Components 212 and 213 do not require platform-specific code-signed certificates, which eliminates the double-authoring problem of prior systems. Furthermore, because only components listed on platform manifest 208 are loaded on O/S partition 202, this eliminates the cross-pollination problem of prior systems.

Packages in the operating system build may contain a catalog file that signs all files in that package. A package name attribute in the catalog references which package is responsible for which catalog so that code integrity can validate the files in a package.

At the time a file is built, the identity of the package(s) that will contain the file is not known. With build file caching, the intended package may change after the file is built. A Binary ID attribute is stored inside the embedded signature in an embedded signed file. The Binary ID is necessary so that the platform manifest can trust the file directly without knowing the package for which the file belongs. The Binary ID may be a SHA256 hash that remains relatively constant through the lifetime of the file and that identifies the file with a reasonable level of fidelity. The word reasonable is used because this will be different in different circumstances, such as a production scenario versus a developer scenario.

Authorized platform manifests may be stored as a counted array in the secure boot configuration policy. One entry holds the count of authorized platform manifests, and there is a separate entry for each authorized manifest.

The platform manifest data file format may be a binary file format defined by the following structures:
  a magic number or file signature to identify the file format;
  a file format version that identifies the version of the file format;
  identification and versioning information, such as a build string, to identify the build that generated this platform manifest file;
  a manifest identifier or universally unique identifier that must match an authorized platform manifest identifier from the secure boot configuration policy;
  a manifest version;
  an entry count representing the number of entries in the manifest itself; and
  the remainder of the file is hashes, each of which specifying the hash of an authorized entity.

The manifest itself may be an array of hashes, the length of which are described by the file format version. To change the hash length, the file format version must be incremented. In some embodiments, the operating system vendor signs the platform manifest data structures, such as by wrapping them in a PKCS#7 signature. In other embodiments, an OEM may sign the platform manifest for use on the OEMs platform.

When the platform manifest files are loaded from disk and the signatures are verified, they are loaded and stored in memory in a package manifest data structure. The package manifest data structure is originally created in the boot environment, where it is used to validate the signatures of the boot components of the operating system. Then package manifest data structure is transferred to the kernel with the same data in memory representation where it is held for the duration of the execution of the operating system. The package manifest data structure includes an array that contains the identification and versioning information for all the platform manifest files that were loaded and contributed hashes.

Figure 3:
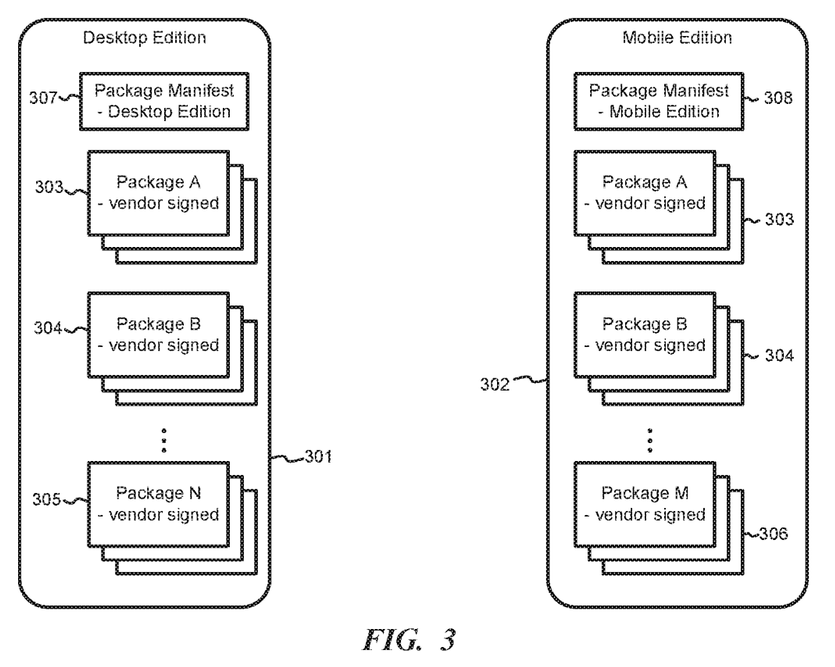
FIG. 3 is a block diagram illustrating different editions of an operating system for different platforms using a platform manifest.

FIG. 3 is a block diagram illustrating different editions of an operating system for different platforms according to an example embodiment using a platform manifest. The operating system vendor may ship desktop edition 301 and mobile edition 302. Each edition uses a large set of common components, such as package A 303 and package B 304. The different editions also have components that are specific to each platform, such as package N 305 that is used in the desktop edition 301 only, and package M 306 that is used in the mobile edition 3002 only.

Instead of requiring a resigning step as illustrated in FIG. 1, in FIG. 3, each edition includes a platform manifest that is tied to a particular platform or device. Package manifest 307 is unique to desktop edition 301, and package manifest 308 is unique to mobile edition 308. The package manifests 307, 308 are tied to a particular device or type of device, such as by a security policy on the device. Individual components, such as packages 303-306 and binaries, that are used in each edition are listed on the package manifest. The package manifests 307, 308 are signed by the vendor. The components do not have to be specifically signed for the edition, but instead can be generally signed by the operating system vendor for verification when loading. The platform eliminates the risk of cross-pollination because components that are signed by the vendor, but are intended for other builds, cannot be loaded if they are not listed on the platform manifest.

Figure 4:
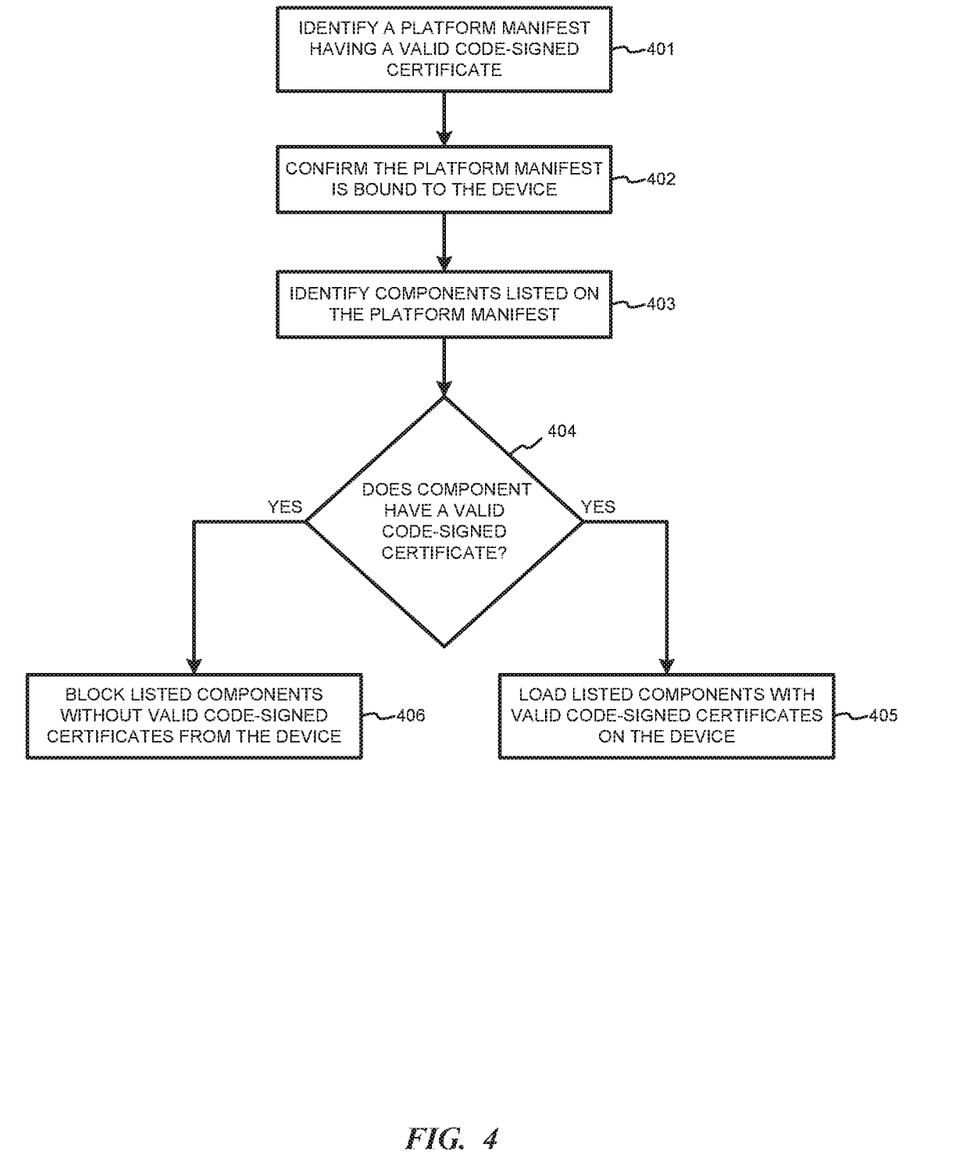
FIG. 4 is a flowchart illustrating a method for managing software components loaded on a device according to one embodiment.

FIG. 4 is a flowchart illustrating a method for managing software components loaded on a device according to one embodiment. In step 401, a platform manifest having a valid code-signed certificate is identified. In step 402, the platform manifest confirmed as being bound to the device. In step 403, components listed on the platform manifest are identified. In step 404, each listed component is evaluated for a valid code-signed certificate.

If the component has a valid code-signed certificate in step 404, then in step 403 the component is loaded on the device. Otherwise, in step 406 components are blocked from the device is they do not have a valid code-signed certificate. The components may be, for example, binaries and packages for an operating system. The components may be signed in an embedded manner or with detached signatures. The platform manifest may be bound to the device in a manner that allows for identification of unauthorized platform manifests.

An additional component having a valid code-signed certificate may be identified. If it is determining that the additional component is not listed on the platform manifest, the additional component is blocked from the device.

A manifest identifier may be identified in a device security policy. The manifest identifier may be used to confirm that the platform manifest is bound to the device.

A plurality of manifest identifiers may be identified in a device security policy. A plurality of platform manifest files corresponding to the plurality of manifest identifiers may then be loaded. The plurality of platform manifest files is merged into an active platform manifest for the device.

Figure 5:
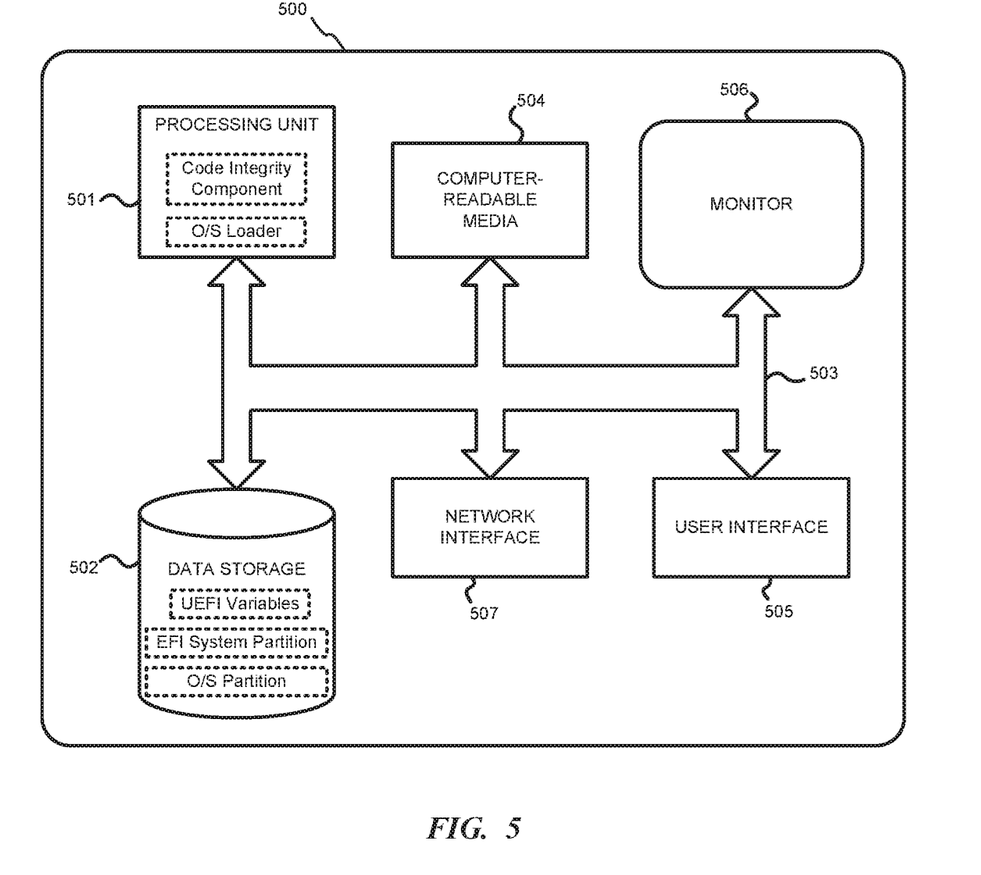
FIG. 5 illustrates an example of a device that provides a suitable computing environment for policy-driven enforcement of a platform manifest.

FIG. 5 illustrates an example of a device 500 that provides a suitable computing environment on which the examples of FIGS. 1-4 may be implemented for policy-driven enforcement of a platform authorization manifest to prevent cross pollination of executables between systems even by entities that may have achieved full admin access on the device. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers (PC), server computers, hand-held or laptop devices, tablet devices, game consoles, smartphones, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform tasks or implement abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general-purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable, and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 may be, for example, computer storage media in the form of volatile and/or nonvolatile memory such as read only memory (ROM), random access memory (RAM), a hard drive, or a solid-state drive. A basic input/output system (BIOS) or UEFI firmware containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may include partitions, such as an EFI system partition and an operating system (O/S) partition, and may store system data such as UEFI variables and security policies. An O/S loader and code integrity component on processing unit 501 may be used to load the operating system and to ensure that components have a valid code-signed certificate.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a game controller, touchscreen, tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device, or other common network node, and typically includes many or all the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets, and the Internet.

When used in a networked or cloud-computing environment, the computer 500 may be connected to a public or private network through a network interface or adapter 507. In some embodiments, a modem, transceiver, network interface card, or other means for establishing communications over the network. The network interface 507, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

An example method for managing software components loaded on a device comprises identifying a platform manifest having a valid certificate; confirming that the platform manifest is bound to the device; identifying components listed on the platform manifest; confirming that the listed components have a valid certificate; and loading listed components with valid certificates on the device. The method may further comprise identifying an additional component having a valid certificate; determining that the additional component is not listed on the platform manifest; and blocking the additional component from the device. The components may be binaries and packages for an operating system.

The method may further comprise identifying a manifest identifier in a device security policy; and using the manifest identifier to confirm that the platform manifest is bound to the device.

The method may further comprise identifying a plurality of manifest identifiers in a device security policy; loading a plurality of platform manifest files corresponding to the plurality of manifest identifiers; and merging the plurality of platform manifest files into an active platform manifest for the device.

The components may be signed in an embedded manner or with detached signatures.

The platform manifest may be bound to the device in a manner that allows for identification of unauthorized platform manifests.

An example device comprises a processor executing an operating system loader and a code integrity component; and a device memory storing a security policy and operating system components; wherein the operating system loader is configured to identify a platform manifest using a platform manifest identifier in the security policy and to load components listed in the platform manifest, and wherein the code integrity component is configured to confirm that the platform manifest and the components listed in the platform manifest have valid certificates before the operating system loader loads the components. The components may be binaries and packages for an operating system.

The device security policy may be used to confirm that the platform manifest is bound to the device.

The operating system loader may be further configured to load a plurality of platform manifest files corresponding to a plurality of manifest identifiers in the security policy and to merge the plurality of platform manifest files into an active platform manifest for the device.

The operating system loader may be further configured to determine that additional components are not listed on the platform manifest and to block the additional components from the device even if the code integrity component identified the additional components as having valid certificates.

The components in the system may be signed in an embedded manner or with detached signatures.

The platform manifest in the system may be bound to the device in a manner that allows for identification of unauthorized platform manifests.

An example method of enforcing an operating system composition comprises selecting a plurality of files to be included in the operating system for a selected platform, the plurality of files having valid file certificates; and generating one or more code-signed platform manifests each having a platform manifest identifier and a valid platform certificate and listing one or more of the plurality of files.

The example method may further comprise controlling what operating system can be loaded on a device by listing acceptable platform manifest identifiers in a device security policy, wherein files for other operating systems will not be loaded on the device if the files do not appear on acceptable platform manifests.

The example method may further comprise merging two or more platform manifests into an active platform manifest for a device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for managing software components loaded on a device that runs a first edition of an operating system, comprising:
   during a boot process:
      loading into memory a secure boot configuration policy comprising an authorized platform manifest identifier that is uniquely associated with the first edition of the operating system;
      based on the authorized platform manifest identifier, identifying a platform manifest that comprises:

a first valid certificate,
a manifest identifier distinct from the first valid certificate, and a list indicating:
a plurality of components that are allowed for the first edition of the operating system, and
a component that:
is also allowed for a second edition of the operating system, and
is signed with a second certificate that is valid for both the first edition of the operating system and the second edition of the operating system;
loading the platform manifest into the memory; and
verifying that the manifest identifier in the platform manifest matches the authorized platform manifest identifier in the secure boot configuration policy;
confirming that the second certificate is a valid certificate; and
loading the component on the device.

2. The method of claim 1, further comprising:
identifying an additional component having a third valid certificate;
determining that the additional component is not listed on the platform manifest; and
blocking the additional component from the device.

3. The method of claim 1, wherein the component comprises a package for the operating system.

4. The method of claim 1, further comprising identifying the manifest identifier in a device security policy that defines the secure boot configuration policy.

5. The method of claim 1, further comprising:
identifying a plurality of manifest identifiers in a device security policy;
loading a plurality of platform manifest files corresponding to the plurality of manifest identifiers; and
merging the plurality of platform manifest files into an active platform manifest for the device.

6. The method of claim 1, wherein the component is signed in an embedded manner or with detached signatures.

7. The method of claim 1, wherein the platform manifest is bound to the device in a manner that allows for identification of unauthorized platform manifests.

8. A system for managing software components loaded on a device that runs a first edition of an operating system, comprising:
one or more processors; and
memory comprising instructions that are executable by the one or more processors to:
during a boot process:
load into memory a secure boot configuration policy, comprising an authorized platform manifest identifier that is uniquely associated with the first edition of the operating system, wherein the secure boot configuration policy is specific to the device or to a type of the device;
based on the authorized platform manifest identifier, identify a platform manifest that comprises:
a first valid certificate,
a manifest identifier distinct from the first valid certificate, and
a list indicating:
a plurality of components that are allowed for the first edition of the operating system, and
a component that:
is also allowed for a second edition of the operating system, and
is signed with a second certificate that is valid for both the first edition of the operating system and the second edition of the operating system and that is not specific to the device or to the type of the device;
load the platform manifest into the memory; and
verify that the manifest identifier in the platform manifest matches the authorized platform manifest identifier in the secure boot configuration policy;
confirm that the second certificate is a valid certificate; and
load the component on the device.

9. The system of claim 8, wherein the instructions are additionally executable by the one or more processors to:
identify an additional component having a third valid certificate;
determine that the additional component is not listed on the platform manifest; and
block the additional component from the device.

10. The system of claim 8, wherein the component comprises a package for the operating system.

11. The system of claim 8, wherein the instructions are additionally executable by the one or more processors to identify the manifest identifier in a device security policy that defines the secure boot configuration policy.

12. The system of claim 8, wherein the instructions are additionally executable by the one or more processors to:
identify a plurality of manifest identifiers in a device security policy;
load a plurality of platform manifest files corresponding to the plurality of manifest identifiers; and
merge the plurality of platform manifest files into an active platform manifest for the device.

13. The system of claim 8, wherein the component is signed in an embedded manner or with detached signatures.

14. The system of claim 8, wherein the platform manifest is bound to the device in a manner that allows for identification of unauthorized platform manifests.

15. A computer-readable storage device having computer-executable instructions stored thereon that, when executed, cause one or more processors to:
during a boot process:
load a secure boot configuration policy into memory of a device that runs a first edition of an operating system, the secure boot configuration policy comprising an authorized platform manifest identifier that is uniquely associated with the first edition of the operating system;
based on the authorized platform manifest identifier, identify a platform manifest that comprises:
a first valid certificate,
a manifest identifier distinct from the first valid certificate, and
a list indicating:
a plurality of components that are allowed for the first edition of the operating system, and
a component that:
is also allowed for a second edition of the operating system, and
is signed with a second certificate that is valid for both the first edition of the operating system and the second edition of the operating system, and that was generated for a particular operating system image;
load the platform manifest into the memory; and
verify that the manifest identifier in the platform manifest matches the authorized platform manifest identifier in the secure boot configuration policy;

confirm that the second certificate is a valid certificate; and load the component on the device.

16. The computer-readable storage device of claim 15, wherein the instructions are additionally executable by the one or more processors to:

identify an additional component having a third valid certificate;

determine that the additional component is not listed on the platform manifest; and block the additional component from the device.

17. The computer-readable storage device of claim 15, wherein the component comprises a package for the operating system.

18. The computer-readable storage device of claim 15, wherein the instructions are additionally executable by the one or more processors to identify the manifest identifier in a device security policy that defines the secure boot configuration policy.

19. The computer-readable storage device of claim 15, wherein the instructions are additionally executable by the one or more processors to:

identify a plurality of manifest identifiers in a device security policy;

load a plurality of platform manifest files corresponding to the plurality of manifest identifiers; and merge the plurality of platform manifest files into an active platform manifest for the device.

20. The computer-readable storage device of claim 15, wherein the component is signed in an embedded manner or with detached signatures.

\* \* \* \* \*